US008971880B2

(12) United States Patent
Brandt et al.

(10) Patent No.: US 8,971,880 B2
(45) Date of Patent: Mar. 3, 2015

(54) ASSOCIATION LEVEL INDICATION TO NEIGHBORING BASE STATIONS

(75) Inventors: Achim Von Brandt, München (DE); Xin Qi, Beijing (CN); Shun Liang Zhang, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 305 days.

(21) Appl. No.: 13/265,552

(22) PCT Filed: Apr. 21, 2009

(86) PCT No.: PCT/EP2009/054719
§ 371 (c)(1),
(2), (4) Date: Jan. 12, 2012

(87) PCT Pub. No.: WO2010/121647
PCT Pub. Date: Oct. 28, 2010

(65) Prior Publication Data
US 2012/0129521 A1    May 24, 2012

(51) Int. Cl.
*H04W 4/00* (2009.01)
*H04W 36/00* (2009.01)

(52) U.S. Cl.
CPC .................................. *H04W 36/0072* (2013.01)
USPC ............................ 455/434; 455/336; 370/331

(58) Field of Classification Search
USPC .......................................... 455/434–444, 561
See application file for complete search history.

(56) References Cited

U.S. PATENT DOCUMENTS

| | | | | |
|---|---|---|---|---|
| 8,086,173 | B2 * | 12/2011 | Zhang et al. | 455/7 |
| 8,811,340 | B2 * | 8/2014 | Jung et al. | 370/331 |
| 2006/0030309 | A1 * | 2/2006 | Lee et al. | 455/422.1 |
| 2007/0037576 | A1 * | 2/2007 | Subramanian et al. | 455/436 |
| 2007/0149196 | A1 | 6/2007 | Choi et al. | 455/436 |
| 2007/0249355 | A1 * | 10/2007 | Kang et al. | 455/439 |
| 2008/0205325 | A1 * | 8/2008 | Lu et al. | 370/320 |
| 2009/0077444 | A1 * | 3/2009 | Qi et al. | 714/748 |
| 2009/0104910 | A1 * | 4/2009 | Lee et al. | 455/436 |
| 2009/0219852 | A1 * | 9/2009 | Youn et al. | 370/315 |
| 2010/0009624 | A1 * | 1/2010 | Youn et al. | 455/9 |
| 2010/0240420 | A1 * | 9/2010 | Chin et al. | 455/574 |
| 2011/0281581 | A1 * | 11/2011 | Brandt et al. | 455/427 |
| 2012/0269079 | A1 * | 10/2012 | Kim et al. | 370/252 |
| 2013/0223408 | A1 * | 8/2013 | Brandt et al. | 370/331 |

FOREIGN PATENT DOCUMENTS

EP    1 594 336 A2    11/2005

* cited by examiner

*Primary Examiner* — Khawar Iqbal
(74) *Attorney, Agent, or Firm* — Harrington & Smith

(57) ABSTRACT

It is described a method of sending an association level indication to neighboring base stations by a serving base station to indicate to the neighbor base station to report a particular ranging parameter set corresponding to the association level indication for a user equipment requesting scanning of neighbor base stations. According to an embodiment, the ranging parameters of the ranging parameter set are provided to the user equipment in single message or are provided in two or more messages, e.g. in the case of network assisted association reporting.

18 Claims, 2 Drawing Sheets

ASSOCIATION LEVEL INDICATION TO NEIGHBORING BASE STATIONS

FIELD OF THE INVENTION

The present invention relates to the field of wireless communication systems and in particular to methods of operating base stations of a wireless communication network.

ART BACKGROUND

Wireless communication networks and in particular cellular communication networks provide a mechanism which allows a user equipment to migrate from the air interface provided by one base station to the air interface provided by another base station. This process is known as handover.

In view of the above-described situation, there exists a need for an improved technique that enables to provide efficient handover of a user equipment from an actually serving base station to a neighboring base station (neighbor base station).

SUMMARY OF THE INVENTION

This need may be met by the subject-matter according to the independent claims. Advantageous embodiments of the herein disclosed subject-matter are described by the dependent claims.

According to a first aspect of the herein disclosed subject-matter, a method of operating a serving base station is provided, wherein the serving base station serves a user equipment of a wireless communication network. The method according to the first aspect comprises sending to a neighbor base station an association level indication. The association level indication requests the neighbor base station to report a ranging parameter said corresponding to one of at least two different levels of association of the neighbor base station with the user equipment. The ranging parameter set is reported to the serving base station for the user equipment. The at least two different levels of association correspond to different ranging parameter sets. Further, each ranging parameter set comprises at least one ranging parameter for the user equipment. According to an embodiment, the at least one ranging parameter allows the user equipment to align its transmissions with a reception window of the neighbor base station.

According to an embodiment of the first aspect, association is an optional initial ranging procedure occurring during scanning interval with respect to one of the neighbor base stations of the serving base station. According to an embodiment, the function of association is to enable the user equipment to acquire and/or record ranging parameters and service availability information for the purpose of proper selection of the handover target base station and/or expediting a potential future handover to a target base station. For example, according to a further embodiment, the at least two different levels of association of the neighbor base station with the user equipment are as defined in IEEE 802.16 Rev2/D4. Hence, according to this embodiment, there are three levels of association: (1) Association level 0: Scan/association without coordination; (2) Association level 1: Association with coordination; (3) Association level 2: Network assisted association reporting.

According to an embodiment, by means of the at least one ranging parameter the neighbor base station provides a ranging region for association at a predefined "rendezvous time" to the user equipment through the serving base station.

According to a further embodiment, the at least one ranging parameter assigns a unique code number, e.g., according to an embodiment, a transmission opportunity, to the user equipment.

According to a further embodiment, the method according to the first aspect further comprises receiving a scanning request from the user equipment, wherein the scanning request requests a scanning time period for the user equipment for seeking available base stations.

According to an embodiment, the scanning request includes a scanning type indicator indicating a preferred one of the at least two levels of association. According to a further embodiment, the association level indication to be sent to the neighbor base station is selected by taking into the account the scanning type indicator received from the user equipment. For example, according to an embodiment, the association level indication is selected to indicate the same level of association as indicates the scanning type indicator received from the user equipment. According to further embodiments, other factors are also taken into account and the association level indication to be sent to the neighbor base station is not necessarily selected to indicate the same level of association as the scanning type indicator from the user equipment.

According to a further embodiment, the association level indication, which is sent to the neighbor base station by the serving base station, is a message element, e.g. a type, length, value tuple (TLV).

According to a further embodiment, the association level indication is sent to the neighbor base station in response to the received scanning request from the user equipment. For example, according to an embodiment, the value of the TLV is derived based on the scanning request received from the user equipment and other factors known to the serving base station. According to a further embodiment, the scanning request is a scanning type TLV included in a scanning interval location request message which may be transmitted by a user equipment to request a scanning interval for the purpose of seeking available base stations and determining their suitability as targets for handover.

According to a further embodiment of the first aspect, the method further comprises receiving from the neighbor base station for the user equipment proposed values for at least one ranging parameter of the ranging parameter set corresponding to the association level indication. For example, according to an embodiment, proposed values for all ranging parameters of the ranging parameter set are received from the neighbor base station. According to another embodiment, proposed values for a subset of ranging parameters of the ranging parameter set is received from the neighbor base station.

According to a further embodiment of the first aspect, the method further comprises receiving proposed values for ranging parameters from a further neighbor base station for the user equipment. For example, there may be one further neighbor base station or two or more neighbor base stations. In order to be able to take into account a further neighbor base station as possible handover target base station, the ranging parameters from these further neighbor base stations are received by the serving base station in one embodiment.

According to a further embodiment of the first aspect, the method further comprises coordinating at the ranging parameters from the neighbor base station and the ranging parameter of the one or more further neighbor base station. In this way, overlapping ranging regions of different neighbor base stations can be avoided. According to a further embodiment, ranging regions from different neighbor base stations which are to judged (by the serving base station) to be too close to each other can be avoided.

According to a further embodiment of the first aspect, the method further comprises sending to the neighbor base station and to the further neighbor base station an association acknowledgement indicating the final values for the ranging parameters of the neighbor base station and the one or more further neighbor base station. According to an embodiment, the final values for the ranging parameters are obtained by coordinating the ranging parameters from the different neighbor base stations.

According to an embodiment of the first aspect, a time indicator, e.g. a time stamp is transmitted from the serving base station to the neighbor base station to indicate the time that the scanning interval location request message is transmitted from the serving base station to the user equipment.

According to a further embodiment of the first aspect, the method further comprises receiving at least one physical ranging parameter from the neighbor base station for the user equipment after sending the final values for the ranging parameters to the user equipment. For example, this may be the case for network assisted association reporting wherein a ranging related message, e.g. a ranging request or a Code Division Multiple Access (CDMA) ranging code, is transmitted from the user equipment to the neighbor base station which in response hereto may assign appropriate values to the further ranging parameters, i.e. the ranging parameters which are received by the serving base station after the serving base station has sent the final values for the ranging parameters to the user equipment. For example, according to an embodiment, the further ranging parameters are offset parameters of a physical layer of the wireless communication network (PHY offset).

According to an embodiment, the neighbor base station sends a message element, e.g. a base station association information report, to the serving base station instead of replying a ranging response to the user equipment. According to an embodiment, the message may include ranging response information on the ranging parameter of the physical layer (e.g. PHY offset): For example, time advance, power offset, frequency offset, ranging result and/or expected service level. According to an embodiment, when the serving base station receives the base station association information report message from the neighbor base station, it acknowledges with a message, e.g. a base station association information acknowledge, to confirm that it received the related information correctly.

According to a further embodiment of the first aspect, sending to the neighbor base station the association level indication comprises sending the association level indication to the neighbor base station via a relay gateway. Generally, "sending information" or "sending an indication" does not require sending this information or the indication directly, but also includes sending the information or indication indirectly via a further network element such as a relay gateway.

Accordingly, receiving information or receiving an indication does not only disclose direct reception of the information or indication, but also indirect reception of the information or indication, e.g. via a further network element such as a relay gateway.

According to a second aspect of the herein disclosed subject-matter, a method for operating a neighbor base station of a wireless communication network is provided, wherein the wireless communication network further comprises a serving base station which serves an user equipment. The method according to the second aspect comprises receiving from the serving base station an association level indication indicating one of at least two different levels of association.

It should be understood, that the levels of association may be defined as disclosed with regard to the first aspect. For example, the at least two different levels of association correspond to different ranging parameter sets. Further, each ranging parameter set may comprise at least one ranging parameter for the user equipment, wherein the at least one ranging parameter allows the user equipment to align its transmissions with a reception window of the neighbor base station.

According to an embodiment of the second aspect, the method comprises sending to the serving base station proposed values for at least one ranging parameter of the ranging parameter set corresponding to the one of the at least two different levels of association indicated by the association level indication.

According to a further embodiment, the at least one ranging parameter comprises a ranging action time which indicates the ranging region assigned by the neighbor base station for the user equipment. According to a further embodiment, the at least one ranging parameter includes a ranging code which indicates a unique code number assigned by the neighbor base station for the user equipment. According to a further embodiment, the at least one ranging parameter comprises a ranging opportunity offset which indicates the transmission opportunity assigned by the neighbor base station for the user equipment.

According to a further embodiment of the second aspect, the method further comprises receiving from the user equipment a ranging related message, for example, according to an embodiment, a ranging request, or, according to another embodiment, a CDMA ranging code.

According to a further embodiment of the second aspect, the method further comprises providing, in response to the ranging related message, of the ranging parameter sets which corresponds to the one of the at least two different levels of association indicated by the association level indication at least one further ranging parameter to the serving base station. An example of a further ranging parameter is e.g. an offset of a parameter of a physical layer of the wireless communication network, e.g. a PHY offset.

For example, according to an embodiment, the at least one further ranging parameter includes a time advance which indicates the time required to advance transmissions from the user equipment to the neighbor base station. This parameter may ensure that frames arrive at the expected time instance at the neighbor base station.

According to a further embodiment, the at least one further ranging parameter includes a power offset indicating the power level offset adjustment which is required for the user equipment.

According to a further embodiment, the at least one further ranging parameter includes a frequency offset which indicates the relative frequency adjustment for the user equipment.

According to a further embodiment, the at least one ranging parameter includes a ranging result which indicates whether the user equipment ranging attempt is within acceptable limits of the neighbor base station.

According to a further embodiment, the at least one further ranging parameter includes an expected service level which indicates the level of service the user equipment can expect from the neighbor base station.

According to a further embodiment, one or more of the ranging parameters or the further ranging parameters are type, length, value tuples (TLV). According to other embodiments, the ranging parameter or the further ranging parameter may be any other message element.

According to a third aspect of the herein disclosed subject-matter, a computer program for processing a physical object, namely an association level indication, is provided, the computer program, when being executed by a data processor, is adapted for controlling the method according to the first aspect or an embodiment thereof.

According to a fourth aspect of the herein disclosed subject-matter, a computer program for processing a physical object, namely an association level indication is provided, the computer program, when being executed by a data processor, is adapted for controlling the method according to the second aspect or an embodiment thereof.

According to a fifth aspect of the herein disclosed subject-matter, a base station of a wireless communication network is provided, wherein the base station comprises a first interface for communication with the user equipment and a second interface for communication with a neighbor base station. Further, the base station comprises a controller configured for sending to the neighbor base station via the second interface an association level indication requesting the neighbor base station to report for the user equipment a ranging parameter set corresponding to one of at least two different levels of association of the neighbor base station with the user equipment.

According to an embodiment, the controller is configured for carrying out the method according to the first aspect or an embodiment thereof.

For example, the at least two different levels of association correspond to different ranging parameter sets in one embodiment.

Further, according to another embodiment, each ranging parameter set comprises at least one ranging parameter for the user equipment, wherein at least one ranging parameter allows the user equipment to align its transmissions with a reception window of the neighbor base station.

According to a sixth aspect of the herein disclosed subject-matter, a base station of a wireless communication network is provided, the base station comprising a first interface for communication with a user equipment. Further, the base station further comprises a second interface for communication with a neighbor base station. The base station according to the sixth aspect further comprises a controller configured for receiving from the serving base station via the second interface an association level indication indicating one of at least two different levels of association. The at least two different levels of association correspond to different ranging parameter sets and each ranging parameter set comprises at least one ranging parameter for the user equipment. According to an embodiment, the at least one ranging parameter allows the user equipment to align its transmissions with a reception window of the neighbor base station.

According to a further embodiment of the sixth aspect, the controller is configured for sending to the serving base station via the second interface a proposed value for at least one ranging parameter of the ranging parameter set corresponding to one of the at least two different levels of association indicated by the association level indication.

It should be noted, that according to other embodiments, a base station is configured for carrying out both, the method according to the first aspect and for carrying out the method according to the second aspect. For example, a base station may be configured to operate as serving base station for a first user equipment and to operate as a neighbor base station for a second, different user equipment. In such a case, the two different methods as described in the first aspect and the second aspect need not necessarily be executed at the same time, but may be executed at the same time depending on actual transmission conditions, e.g. the load of the base station. According to other embodiments, the methods according to the first aspect and the second aspect may be carried out subsequently.

According to an embodiment, the at least two levels of association are predetermined levels of association. For example, according to respective embodiments, the predetermined levels of association are defined in the serving base station and/or in the neighbor base station and/or in the user equipment and are therefore known to the controllers of these entities.

As used herein, reference to a non-transitory computer program is intended to be equivalent to a reference to a program element and/or a computer-readable medium containing instructions for controlling a computer system to coordinate the performance of the above-described method according to the first aspect, according to the second aspect, or according to both the first aspect and the second aspect.

The computer program may be implemented as computer-readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the WorldWideWeb, from which it may be downloaded. Further, according to another embodiment, the computer program is a full release. According to other embodiments, the computer program is an update to an existing program.

Aspects and embodiments of the herein disclosed subject-matter or any component recited herein, may be realized by means of a computer program respectively software. However, the herein disclosed subject-matter may be realized by means of one or more specific electronic circuits respectively hardware. Furthermore, the herein disclosed subject-matter may also be realized in a hybrid form, i.e. in a combination of software modules and hardware modules.

In the following, there will be described exemplary embodiments of the herein disclosed subject-matter with reference aspects and embodiments of the herein disclosed subject matter. It has also to be pointed out that of course any combination of features relating to different aspects of the herein disclosed subject-matter is also possible. In particular, some embodiments have been described with reference to a method of operating a serving base station, and a method for operating a neighbor base station. Further, some embodiments have been described with reference to method type claims whereas other embodiments have been described with reference to apparatus type claims. However, a person skilled in the art will gather from the above and the following description that, unless otherwise notified, in addition to any combination of features belonging to one aspect also combinations between features relating to different aspects or embodiments, for example even between features of the apparatus type claims and features of the method type claims, or between features of the method according to the first aspect and features of the method according to the second aspect is considered to be disclosed with this application.

It should be noted that although the claims and the description herein refers to the term "base station", this term is not restricted to a base station of a particular standard. Further, the base station may include typical features of base stations as defined in various wireless communication standards as well as features of controlling entities of such systems, for example of base station controllers.

The aspects and embodiments defined above and further aspects and embodiments of the herein disclosed subject-matter are apparent from the examples and embodiments to be described hereinafter and are explained with reference to the drawings but to which the invention is not limited.

DETAILED DESCRIPTION

Figure 1:
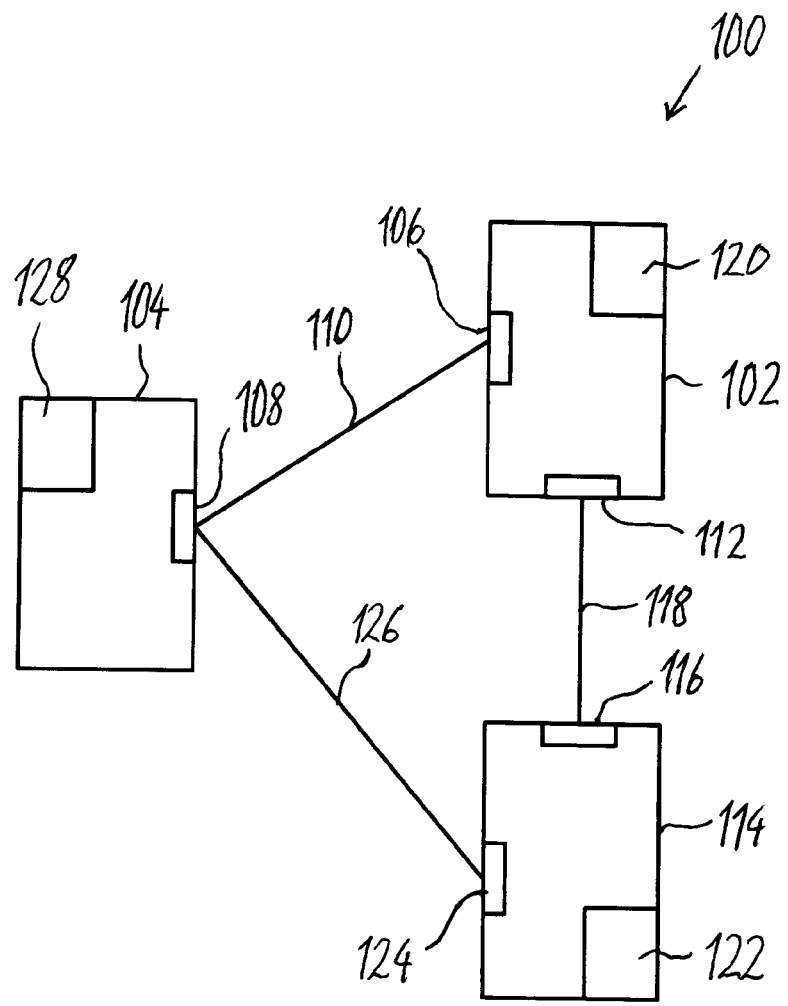
FIG. 1 shows a part of a wireless communication network according to embodiments of the herein disclosed subject-matter.

The illustration in the drawings is schematic. It is noted that in different figures, similar or identical elements are provided with reference signs which are different from the corresponding reference signs only within an appended character.

FIG. 1 shows part of a wireless communication network 100 comprising a serving base station 102 which serves as a user equipment 104. The base station 102 comprises a first interface 106 for communication with the user equipment 104. To this end, the user equipment 104 comprises a corresponding interface 108 for communication with the serving base station 102. A wireless communication link between the user equipment 104 and the serving base station 102 is indicated at 110 in FIG. 1. The serving base station 102 comprises a second interface 112 for communication with a neighbor base station 114. To this end, the neighbor base station 114 comprises a corresponding interface 116 for communication with the serving base station 102. Communication between the serving base station 102 and the neighbor base station 114 is indicated at 118 in FIG. 1.

In accordance with embodiments of the herein disclosed subject-matter, the serving base station 102 comprises a controller 120 configured for sending to the neighbor base station 114 an association level indication via the second interface 112. The neighbor base station 114 receives the association level indication via its second interface 116 and is informed by the association level indication that a respective ranging parameter set corresponding to the association level indication is to be transmitted to the serving base station 102.

According to an embodiment, the association level indication is a type, length, value tuple (TLV tuple). For example, according to an embodiment, the TLV tuple may indicate to the neighbor base station 114 to select one of at least two different levels of association for reporting ranging parameters, wherein a separate ranging parameter set is associated with each of the different levels of association, e.g. in the form of a lookup table. Such a lookup table may be stored in a controller 122 of the neighbor base station. Each ranging parameter set comprises at least one ranging parameter which allows the user equipment 104 to align its transmissions with a reception window of the neighbor base station 114. For communication with the user equipment 104, the neighbor base station 114 comprises a first interface 124. Communication between the user equipment 104 and the neighbor base station 114 is indicated at 126 in FIG. 1.

The controller 122 of the neighbor base station 114 is configured for receiving from the serving base station 102 the association level indication indicating the one of the at least two levels of association. The controller 122 of the neighbor base station 114 is further configured for sending to the serving base station via the second interface 116 a proposed value for at least one ranging parameter of the ranging parameter set which corresponds to the association level indicated by the serving base station 102. For example, according to an embodiment, the controller 122 is configured for sending to the serving base station 102 a proposed value for each ranging parameter of a first ranging parameter set corresponding to a first level of association and is configured for sending to the serving base station 102 a proposed value for only a subset of at least two ranging parameters of a second ranging parameter set in the case that the association level indication indicates a second level of association.

The controller 120 of the serving base station 102 is configured for receiving from the neighbor base station 114 the proposed values for at least one ranging parameter of the ranging parameter set which corresponds to the association level indication. According to further embodiments, the controller 120 of the serving base station is configured for receiving proposed values for ranging parameters from further neighbor base stations (not shown in FIG. 1) for the user equipment 104. In response to the received proposed values for at least one ranging parameter of at least one neighbor base station, the serving base station sends final values for the respective ranging parameters of the at least one neighbor base station to the user equipment. According to an embodiment, the final values for the ranging parameters are equal to the proposed values received from the at least one neighbor base station. According to another embodiment, the controller 120 of the serving base station 102 is configured for coordinating the ranging parameters from at least two neighbor base stations, thereby determining the final values for the ranging parameters of the at least two neighbor base stations which are then sent to the user equipment 104.

According to an embodiment, wherein only a subset of at least two ranging parameters of a ranging parameter set, which corresponds to the association level indication, is sent to the serving base station via the second interface 116 of the neighbor base station 114, final values are sent by the serving base station to the user equipment 104 only for the subset of ranging parameters. In this case, a controller 128 of the user equipment 104 may be configured for sending via the interface 108 a ranging related message, e.g. a ranging request or a code division multiple access (CDMA) ranging code to the neighbor base station 114. The ranging related message is received by the neighbor base station 114 via its first interface 124.

According to an embodiment, the controller 122 of the neighbor base station 114 is configured for providing, in response to the ranging related message, at least one ranging parameter of the ranging parameter set which corresponds to the association level indication. According to an embodiment, the at least one ranging parameter which is sent to the serving base station in response to the ranging related message, is the at least one remaining ranging parameter which completes the above-mentioned subset of ranging parameters to the respective set of ranging parameters.

According to an embodiment, the interfaces 108, 106, 112, 116, 124 described above are single interfaces. According to other embodiments, the above-described interfaces may be representative of two or more sub-interfaces. For example, different messages may be sent via different (sub) interfaces.

In the following, an exemplary case wherein the association between the user equipment (e.g. mobile station, MS) and related base station(s) is realized in accordance with IEEE 802.16 spec is given as an example of realization of embodiments of the herein disclosed subject matter. Compatible with the IEEE 802.16 spec, the following possible new parameters are introduced in backhaul (WiMAX access service network (ASN)) messages:

For Association Level 1:

1. A new TLV (association level indication) is introduced in a backhaul message from the serving base station to the at least one neighbor base station to indicate it the association level. The value of the TLV is derived based on the scanning type TLV included in MOB_SCN-REQ message from the user equipment, and other possible factor of the serving base station.

2. A new TLV (ranging action time) is introduced in a backhaul message from the neighbor base station to the serving base station to indicate the assigned ranging region by the neighbour base station for the user equipment.

3. A new TLV (ranging code) is introduced in a backhaul message from the neighbor base station to the serving base station to indicate the assigned unique code number by the neighbor base station for the user equipment.

4. A new TLV (ranging opportunity offset, or possible other names) is introduced in a backhaul message from the neighbor base station to the serving base station to indicate the assigned transmission opportunity by the neighbor base station for the user equipment.

5. A new TLV (time stamp) is introduced in a backhaul message from the serving base station to the neighbor base station to indicate the time that the MOB_SCN-RSP is transmitted from the serving base station to the user equipment.

For association level 2 additional new TLV are introduced in addition to those for association level 1:

6. A new TLV (time advance) is introduced in a backhaul message from the neighbor base station to the serving base station to indicate the time required to advance user equipment transmissions (so frames arrive at the expected time instance at the neighbor base station).

7. A new TLV (power offset) is introduced in a backhaul message from the neighbor base station to the serving base station to indicate the power level offset adjustment required for the user equipment.

8. A new TLV (frequency offset) is introduced in a backhaul message from the neighbor base station to the serving base station to indicate the relative frequency adjustment for the user equipment.

9. A new TLV (ranging result) is introduced in a backhaul message from the neighbor base station to the serving base station to indicate whether the MS ranging attempt is within acceptable limits of the neighbor base station.

10. A new TLV (expected service level) is introduced in a backhaul message from the neighbor base station to the serving base station to indicate the level of service the user equipment can expect.

Further in compatibility with IEEE 802.16 spec, the following possible new RRM messages and process are introduced:

1. Upon receiving a MOB_SCN-REQ message, the serving base station checks the scanning type TLV included in the message, or the serving base station initiates the association unsolicited. Based on the set of the TLV (such as 0b010 or 0b011, corresponding to the first association level and the second association level, respectively), the serving base station sends a message (named as mobile station (MS) association request) to the neighbor base stations selected by the mobile station and the networks. The message includes an association level indication TLV.

Upon receiving the MS association request message, the neighbor base station checks the association level TLV to know the required association level.

In case of the association level 1, the following steps are performed.

2. The neighbour base station should assign the association related parameters to the mobile station, and then replies the serving base station with a message (named as MS association response), which includes the assigned parameters to the mobile station: ranging action time, ranging code, and ranging opportunity offset, etc.

3. The serving base station checks the effective of the assigned parameters (association related) to the user equipment upon receiving MS association response message from neighbor base station(s), then it confirms the neighbor base station(s) with a message (named as MS Association Acknowledge), which may include association relate parameters (Ranging Action Time, and Ranging Opportunity Offset) with the final determined values after coordination by the serving base station.

In case the assigned ranging regions from more than one neighbour base station(s) are overlapping or too close each other, the serving base station makes a coordination and indicate an appropriate ranging regions to certain neighbor base station(s) in the acknowledge message.

Besides, an additional parameter "time stamp" is included in the message to inform the neighbor base station when the MOB_SCN-RSP is sent to the mobile station.

In case of the association level 2, besides the aforementioned steps, the following additional steps are required.

4. Upon receiving a RNG-REQ or the CDMA ranging code, the neighbour base station assigns the related PHY offset parameters. Instead replies the RNG-RSP to the user equipment, the neighbour base station sends a message (named as base station (BS) association information report) to the serving base station. The message includes RNG-RSP information on PHY offset: Time advance, power offset, frequency offset, ranging result, and expected service level.

5. When the serving base station received the base station association information report message from the neighbor base station, it acknowledges with a message (BS association information acknowledge) to confirm it got the related information correctly.

Figure 2:
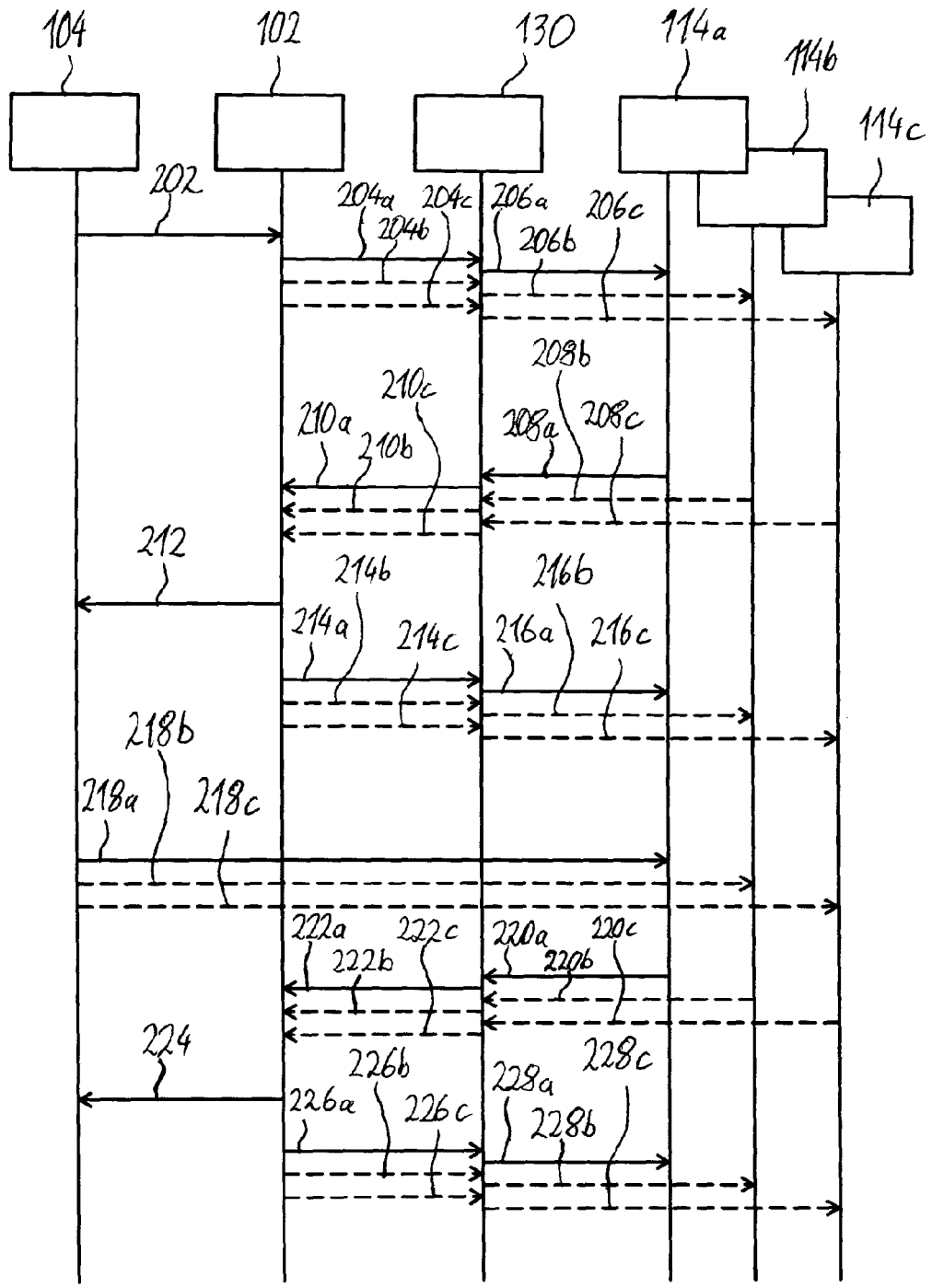
FIG. 2 shows a signalling scheme according to embodiments of the herein disclosed subject-matter.

FIG. 2 shows a exemplary signalling scheme according to embodiments of the herein disclosed subject-matter. For illustration purposes, reference is made to the above defined new parameters and messages.

The description of FIG. 2 involves the entities of the user equipment 104, a serving base station 102, a relay access service network gateway 130, a first neighbor base station 114a, a second neighbor base station 114b and a third neighbor base station 114c.

The backhaul signalling process illustrated in FIG. 2 is exemplarily described with regard to a WiMAX backhaul signalling according to the standard IEEE 802.16, Rel 1.3.0.

In a first step 202 (step 1) the user equipment, e.g. a mobile station, sends a MOB_SCN-REQ message (scanning interval location request message) to the serving base station 102 to request a scanning interval for the purpose of seeking available base station(s) and determining their suitability as targets for handover. The scanning type TLV (time, length, value tuple) included in the message indicates the preferred association level of the user equipment 104. In case the value of the TLV is 0b010 or 0b011, corresponding to association level 1 (association with coordination) and association level 2 (network assisted association reporting), respectively, the following steps are performed.

In a second step (step 2), in the case the scanning is indicated with association level 1 or 2, the serving base station 102 sends the user equipment association request message 204a, 204b, 204c towards the selected neighbor base stations 114a, 114b, 114c. The selected neighbor base station can be acquired based on the base station list included in the MOB_SCN-REQ message and other factors. The serving base station sets the association level indication TLV to indicate the required association level. The specific value for the MOB_SCN-REQ message can be acquired by the serving base station 102 based on the scanning type TLV included in the MOB_SCN-REQ message and other factors.

In the case that no direct direction exists between the serving base stations and the neighbor base stations, e.g. in the case where a relay entity, e.g. in the form of an access service network gateway (ASN-GW) is present, the relay entity 130 relays the message to the neighbor base stations as messages 206a, 206b, 206c, respectively (step 3).

In a further step (step 4), upon receiving the user equipment association request message, the neighbor base station 114a, 114b, 114c checks the association level indication TLV to be informed about the requested association level. For example, in case of association level 1 or level 2 defined above, the neighbor base station 114a, 114b, 114c assigns the related parameters and replies to the serving base station 102 with an association response message 208a, 208b, 208c, 210a, 210b, 210c via the relay entity 130 to the serving base station 102 for the user equipment 104.

The relay entity 130 relays the association response message as message 210a, 210b, 210c to the serving base station 102 if no direct connection between the neighbor base station and the serving base station exists (step 5).

Upon reception of the association response message 210a, 210b, 210c from the neighbor base station 114a, 114b, 114c, the serving base station 102 performs a coordination of the assigned parameters from the neighbor base stations 114a, 114b, 114c (step 6). In the case that the assigned ranging regions from the neighbor base stations are overlapping or are too close to each other, e.g. exceeding a maximum allowed proximity, then the serving base station 102 performs an adjustment of the parameters to a certain assigned ranging region from a respective neighbor base station 114a, 114b, 114c. It should be noted, that depending on the proposed parameters, no parameters, some parameters or all parameters may be adjusted by the serving base station 102.

The serving base station 102 replies to the user equipment the scanning interval location response message (MOB_SCN-RSP message), which includes ranging related parameters assigned by the neighbor base stations 114a, 114b, 114c. The MOB_SCN-RSP message is indicated at 212 in FIG. 2. In the MOB_SCN-RSP message, the serving base station 102, according to an embodiment, sets the value of the rendezvous time TLV according to the ranging action time TLV included in the association response message 210a, 210b, 210c and sets the value of the CDMA code TLV according to the ranging code TLV included in the association response message 210a, 210b, 210c, and sets the value of the transmission opportunity offset TLV according to the ranging opportunity offset TLV included in the association response message 210a, 210b, 210c.

In a further step (step 7), the base station sends the user equipment association acknowledge message 214a, 214b, 214c to the neighbor base stations 114a, 114b, 114c to indicate the final determined value for ranging parameters (ranging action time, ranging opportunity offset, time stamp) after coordination. The respective value of these ranging parameters may be different from the original value assigned by the neighbor base stations 114a, 114b, 114c in step 4.

The relay entity 130 relays the association acknowledge message 214a, 214b, 214c as message 216a, 216b, 216c to the neighbor base stations 114a, 114b, 114c in the case that no direct connection between the serving base station 102 and the neighbor base stations exists (step 8).

According to an embodiment, the backhaul signalling process is completed with the reception of the association acknowledge messages 216a, 216b, 216c by the respective neighbor base station 114a, 114b, 114c. For example, this may be the case for an association level 1 which corresponds to association with coordination.

According to another embodiment, e.g. according to an association level 2 corresponding to network assisted association reporting, further steps are performed as described hereinafter.

In this sense, if according to an embodiment an association level 2 indication is received, the user equipment 104 transmits a CDMA ranging code or a ranging request message to the at least one neighbor base station 114a, 114b, 114c in a ranging related message 218, 218b, 218c (step 9).

Upon receiving the ranging related message 218a, 218b, 218c, the neighbor base station assigns a ranging parameter, e.g. a related PHY offset parameter for the user equipment 104 (step 10). The respective neighbor base station 114a, 114b, 114c does not send a ranging response message (RNG-RSP message) to the user equipment 104, but sends a base station association information report message 220a, 220b, 220c to the serving base station 102 to indicate the information on the PHY offset: Time advance, power offset, frequency offset, ranging result, and expected service level. It should be noted, that in association level 1, this information is transferred to the user equipment 104 by the ranging response message (RNG-RSP message).

The relay entity 130 relays the base station association information report message 220a, 220b, 220c to the serving base station 102 in the case that no direct connection between the neighbor base station 114a, 114b, 114c and the serving base station 102 exists (step 11). These relayed messages are indicated at 222a, 222b, 222c in FIG. 2.

Upon receiving the base station association information report message 220a, 220b, 220c from the neighbor base stations 114a, 114b, 114c, the serving base station 102 replies to the user equipment 104 with an association result report message (MOB_ISC-REP message) (step 12).

In particular, when association level 2 is used, according to an embodiment, the user equipment does not have to wait for the ranging response message (RNG-RSP) from the neighbor base station after sending the RNG-REQ or ranging code to the neighbor base stations. Instead, the ranging response information (RNG-RSP) may be sent by each neighbor base station to the serving base station, e.g. with a backbone. The serving base station may aggregate all the RNG-RSP messages to a single message, the association result report message, which at the serving base station then sends to the user equipment.

For example, according to an embodiment the serving base station sets the value of the timing adjust TLV according to the time advance TLV included in the association response message and sets the value of the offset frequency adjust TLV according to the frequency offset TLV included in the association response message 210a, 210b, 210c, and sets the value of the power level adjust TLV according to the power offset TLV included in the association response message, and sets the value of ranging status TLV according to the ranging result TLV included in the association response message, and sets the value of the service level prediction TLV according to the expected service level TLV included in the association response message. The association result report message (MOB_RSC-REP message) is indicated at 224 in FIG. 2.

In a further step, the serving base station 102 replies to the neighbor base stations 114a, 114b, 114c an association information acknowledge message to confirm that the base station association information report message 222a, 222b, 222c has been correctly received. The association information acknowledge message is indicated at 226a, 226b, 226c in FIG. 2.

In the case that no direct connection exists between the serving base station 102 and the neighbor base stations 114a, 114b, 114c, the relay entity 130 relays the messages 226a, 226, 226c as messages 228a, 228b, 228c to the respective neighbor base station 114a, 114b, 114c.

It should be noted, that although the serving base station 102 and the neighbor base stations 114, 114a, 114b, 114c have been described separately above, according to an embodiment, each base station of the wireless communication network may act as serving base station or as a neighbor base station in the sense disclosed herein.

Having regard to the above, it should be noted that the invention is not restricted to a possible relation to IEEE 802.16 spec. Rather, the concepts of the herein disclosed subject matter are applicable to many other wireless communication networks and use cases.

According to embodiments of the herein disclosed subject-matter, any component of the wireless communication network, e.g. components of the user equipment or components of the base stations are provided in the form of respective computer programs or computer program products which enable a processor to provide the functionality of the respective elements as disclosed herein. According to other embodiments, any component of the wireless communication system, e.g. components of the user equipment or components of the base stations may be provided in hardware. For example, the controllers or interfaces disclosed herein may be provided in software or in hardware. According to other—mixed—embodiments, some components are provided in software while other components are provided in hardware.

It should be noted that the term "comprising" does not exclude other elements or steps and that "a" or "an" does not exclude a plurality. Also elements described in association with different embodiments may be combined. It should also be noted that reference signs in the claims should not be construed as limiting the scope of the claims.

In order to recapitulate the above-described embodiments of the herein disclosed subject-matter, one can state:

A method of operating a serving base station is described, wherein the neighbor base station sends an association level indication to a neighbor base station to indicate to the neighbor base station to use a particular ranging parameter set corresponding to the association level indication in a report to a user equipment requesting scanning of neighbor base stations. According to an embodiment, the ranging parameters of the ranging parameter set are provided to the user equipment in single message or are provided in two or more messages, e.g. in the case of network assisted association reporting.

LIST OF REFERENCE SIGNS 100 wireless communication network
102 serving base station
104 user equipment
106 first interface of the serving base station
108 interface of the user equipment
110 communication between the user equipment and the serving base station
112 second interface of the serving base station
114 neighbor base station
116 second interface of the neighbor base station
118 communication between the serving base station and the neighbor base station
120 controller of the serving base station
122 controller of the neighbor base station
124 first interface of the neighbor base station
126 communication between the user equipment and the neighbor base station
128 controller of the user equipment
130 relay entity
202 MOB_SCN-REQ message (scanning type, neighbor base station list)
204a, 204b, 204c mobile station association request message (association level indication)
206a, 206b, 206c mobile station association request message (association level indication)
208a, 208b, 208c mobile station association response ranging message (ranging action time, ranging code, ranging opportunity)
210a, 210b, 210c mobile station association response message (ranging action time, ranging code, ranging opportunity)
212 MOB_SCN-RSP message (rendezvous time, CDMA code, transmission opportunity offset)
214a, 214b, 214c mobile station association acknowledge message (ranging action time, ranging opportunity offset, time stamp)
216a, 216b, 216c mobile station association acknowledge message (ranging action time, ranging opportunity offset, time stamp)
218a, 218b, 218c RNG-REQ/CDMA ranging code
220a, 220b, 220c base station association information report (time advance, power offset, frequency offset, ranging result, expected service level)
222a, 222b, 222c base station association information report (ranging action time, ranging code, ranging opportunity)
224 MOB_RSC-REP (timing adjust, offset frequency adjust, frequency offset, power level adjust, ranging status, service level prediction)
226a, 226b, 226c base station association information acknowledge
228a, 228b, 228c base station association information acknowledge

The invention claimed is:

1. A method comprising:
sending to a first neighbor base station an association level indication requesting that the first neighbor base station reports for a user equipment a ranging parameter set corresponding to one of at least two different levels of association of the first neighbor base station with the user equipment, the association level indication using type, length, and value (TLV) encoding to specify a parameter type, a parameter length, and a parameter value for selecting a corresponding association level of the at least two different levels of association;
wherein said at least two different levels of association correspond to different ranging parameter sets; and each ranging parameter set comprises at least one ranging parameter for said user equipment, said at least one ranging parameter allowing said user equipment to align its transmissions with a reception window of the first neighbor base station;

receiving from said first neighbor base station for said user equipment proposed values for at least one ranging parameter of said ranging parameter set corresponding to said association level indication, the proposed values comprising values for time advance, power offset, frequency offset, ranging result, and expected service level;

receiving proposed values for ranging parameters from a second neighbor base station for said user equipment, the proposed values comprising values for time advance, power offset, frequency offset, ranging result, and expected service level;

coordinating said ranging parameters from said first neighbor base station and said ranging parameters of said second neighbor base station; and sending to said first neighbor base station and said second neighbor base station an association acknowledgement indicating final values for the ranging parameters of said first neighbor base station and said second neighbor base station.

2. A method according to claim 1, further comprising:
receiving a scanning request from said user equipment, said scanning request requesting a scanning time period for the user equipment for seeking available base stations; and sending to said first neighbor base station said association level indication in response to the received scanning request.

3. A method according to claim 2, wherein:
said scanning request includes a scanning type indicator indicating a preferred one of said at two levels of association; and selecting said association level indication to be sent to said first neighbor base station by taking into account said scanning type indicator.

4. A method according to claim 1, further comprising:
receiving at least one further ranging parameter from the first neighbor base station for the user equipment after sending the final values for the ranging parameters to the user equipment.

5. A method according to claim 1, wherein sending to said first neighbor base station said association level indication comprises sending said association level indication to said first neighbor base station via a relay gateway.

6. A computer program product comprising a non-transitory computer readable medium bearing computer program code, which when executed by a data processor, causes an apparatus to perform the method as set forth in claim 1.

7. A method comprising:
receiving from a serving base station an association level indication indicating one of at least two different levels of association, the association level indication using type, length, and value (TLV) encoding to specify a parameter type, a parameter length, and a parameter value for selecting a corresponding association level of the at least two different levels of association;

wherein said at least two different levels of association correspond to different ranging parameter sets; and each ranging parameter set comprises at least one ranging parameter for a user equipment, said at least one ranging parameter allowing said user equipment to align its transmissions with a reception window of a neighbor base station;

sending to said serving base station proposed values for at least one ranging parameter of said ranging parameter set corresponding to said one of said at least two different levels of association indicated by said association level indication, the proposed values comprising values for time advance, power offset, frequency offset, ranging result, and expected service level; and wherein receiving from said serving base station said association level indication comprises receiving said association level indication form said serving base station via a relay gateway.

8. A method according to claim 7, further comprising:
receiving from said user equipment a ranging related message; and providing, in response to said ranging related message and said ranging parameter set which corresponds to said one of said at least two different levels of association indicated by said association level indication, at least one further ranging parameter to said serving base station.

9. A method according to claim 7, wherein said at least one ranging parameter comprises a ranging action time parameter indicating a ranging time interval reserved by the neighbor base station for the user equipment.

10. A method according to claim 7, wherein said at least one ranging parameter comprises a time advance parameter indicating a time interval required for advancing transmissions of the user equipment to said neighbor base station.

11. A method according to claim 7, wherein said at least one ranging parameter comprises a ranging result parameter indicating whether the ranging attempt of the user equipment is within acceptable limits of the neighbor base station.

12. An apparatus comprising at least one processor and at least one memory including computer program code, the at least one memory and the computer program code being configured, with the at least one processor, to cause the apparatus to perform at least the following:

sending to a first neighbor base station association level indication requesting that the first neighbor base station reports for a user equipment a ranging parameter set corresponding to one of at least two different levels of association of the first neighbor base station with the user equipment, the association level indication using type, length, and value (TLV) encoding to specify a parameter type, a parameter length, and a parameter value for selecting a corresponding association level of the at least two different levels of association;

wherein said at least two different levels of association correspond to different ranging parameter sets;

wherein each ranging parameter set comprises at least one ranging parameter for said user equipment, said at least one ranging parameter allowing said user equipment to align its transmissions with a reception window of the neighbor base station;

receiving from said first neighbor base station for said user equipment proposed values for at least one ranging parameter of said ranging parameter set corresponding to said association level indication, the proposed values comprising values for time advance, power offset, frequency offset, ranging result, and expected service level;

receiving proposed values for ranging parameters from a second neighbor base station for said user equipment, the proposed values comprising values for time advance, power offset, frequency offset, ranging result, and expected service level; and coordinating said ranging parameters from said first neighbor base station and said ranging parameters of said second neighbor base station; and sending to said first neighbor base station and said second neighbor base station an association acknowledgement indicating final values for the ranging parameters of said first neighbor base station and said second neighbor base station wherein sending said association level indication comprises sending said association level indication via a relay gateway.

13. The apparatus of claim 12, wherein the at least one memory and the computer program code are further configured, with the at least one processor, to cause the apparatus to perform at least the following:

receiving a scanning request from said user equipment, said scanning request requesting a scanning time period for the user equipment for seeking available base stations; and sending to said first neighbor base station said association level indication in response to the received scanning request.

14. The apparatus of claim 13 wherein:

said scanning request includes a scanning type indicator indicating a preferred one of said at two levels of association; and selecting said association level indication to be sent to said first neighbor base station by taking into account said scanning type indicator.

15. The apparatus of claim 12, wherein the at least one memory and the computer program code are further configured, with the at least one processor, to cause the apparatus to perform at least the following:

receiving at least one further ranging parameter from the first neighbor base station for the user equipment after sending the final values for the ranging parameters to the user equipment.

16. An apparatus comprising at least one processor and at least one memory including computer program code, the at least one memory and the computer program code being configured, with the at least one processor, to cause the apparatus to perform at least the following:

receiving from a serving base station an association level indication indicating one of at least two different levels of association, the association level indication using type, length, and value (TLV) encoding to specify a parameter type, a parameter length, and a parameter value for selecting a corresponding association level of the at least two different levels of association;

wherein said at least two different levels of association correspond to different ranging parameter sets, and each ranging parameter set comprises at least one ranging parameter for said user equipment, said at least one ranging parameter allowing said user equipment to align its transmissions with a reception window of the neighbor base station;

sending to said serving base station proposed values for at least one ranging parameter of said ranging parameter set corresponding to said one of said at least two different levels of association indicated by said association level indication, the proposed values comprising values for time advance, power offset, frequency offset, ranging result, and expected service level;

wherein receiving from said serving base station said association level indication comprises receiving said association level indication from said serving base station via a relay gateway.

17. The apparatus of claim 16, wherein the at least one memory and the computer program code are further configured, with the at least one processor, to cause the apparatus to perform at least the following:

receiving from said user equipment a ranging related message; and providing, in response to said ranging related message and said ranging parameter set which corresponds to said one of said at least two different levels of association indicated by said association level indication, at least one further ranging parameter to said serving base station.

18. The apparatus of claim 16, wherein said at least one ranging parameter comprises a ranging action time parameter indicating a ranging time interval reserved by the neighbor base station for the user equipment.

* * * * *